US009436336B2

(12) United States Patent
Lee

(10) Patent No.: US 9,436,336 B2
(45) Date of Patent: Sep. 6, 2016

(54) IN-CELL TOUCH DISPLAY STRUCTURE

(71) Applicant: SuperC-Touch Corporation, New Taipei (TW)

(72) Inventor: Hsiang-Yu Lee, New Taipei (TW)

(73) Assignee: SUPERC-TOUCH CORPORATION, New Taipei (TW)

(*) Notice: Subject to any disclaimer, the term of this patent is extended or adjusted under 35 U.S.C. 154(b) by 57 days.

(21) Appl. No.: 14/521,299

(22) Filed: Oct. 22, 2014

(65) Prior Publication Data
US 2015/0085208 A1    Mar. 26, 2015

Related U.S. Application Data

(63) Continuation-in-part of application No. 14/493,784, filed on Sep. 23, 2014.

(30) Foreign Application Priority Data

Sep. 24, 2013  (TW) .............. 102217826 U
Oct. 25, 2013  (TW) .............. 102219898 U

(51) Int. Cl.
G02F 1/1333    (2006.01)
G06F 3/044     (2006.01)
G06F 3/041     (2006.01)

(52) U.S. Cl.
CPC ............. *G06F 3/044* (2013.01); *G06F 3/0412* (2013.01)

(58) Field of Classification Search
CPC ..... G06F 1/1643; G06F 3/0412; G06F 3/041
USPC .......................................................... 349/12
See application file for complete search history.

(56) References Cited

U.S. PATENT DOCUMENTS

| | | | | |
|---|---|---|---|---|
| 2010/0020029 A1* | 1/2010 | Park | ............... | G06F 3/0412 345/173 |
| 2010/0066650 A1* | 3/2010 | Lee | ............... | G02F 1/13338 345/64 |
| 2010/0123668 A1* | 5/2010 | Kuhn | ............... | G06F 3/0488 345/173 |
| 2011/0175824 A1* | 7/2011 | Chiu | ............... | G06F 3/0418 345/173 |
| 2012/0162584 A1* | 6/2012 | Chang | ............... | G06F 3/0412 349/106 |
| 2012/0249454 A1* | 10/2012 | Teraguchi | ............... | G06F 3/0412 345/173 |
| 2013/0314371 A1* | 11/2013 | Lee | ............... | G06F 3/0412 345/174 |
| 2013/0335365 A1* | 12/2013 | Kim | ............... | G06F 3/0412 345/174 |
| 2014/0204055 A1* | 7/2014 | Lu | ............... | G06F 3/0412 345/174 |

FOREIGN PATENT DOCUMENTS

CN          103941897       *  7/2014   ........... G06F 3/0412

* cited by examiner

Primary Examiner — Sang V Nguyen
(74) Attorney, Agent, or Firm — Muncy, Geissler, Olds & Lowe, P.C.

(57) ABSTRACT

An in-cell touch display structure includes: upper and lower substrates, a display material layer configured between the upper and lower substrates, and a thin film transistor and sensing electrode layer including a gate line sub-layer and a source line sub-layer. The gate line sub-layer includes plural gate lines arranged in a first direction, and plural first sensing conductor segments arranged in a second direction, The first sensing conductor segments are separated by the gate lines. The source line sub-layer includes plural source lines arranged in the second direction, plural second sensing conductor segments arranged in the first direction, and plural connection traces arranged in the second direction and parallel to the source lines. The second sensing conductor segments are separated by the source lines and the connection traces. The first sensing conductor segments are electrically connected to the second sensing conductor segments for forming a plurality sensing conductor blocks.

16 Claims, 12 Drawing Sheets

IN-CELL TOUCH DISPLAY STRUCTURE

CROSS REFERENCE TO RELATED APPLICATION

This application claims the benefits of the Taiwan Patent Application Serial Number 102219898, filed on Oct. 25, 2013, the subject matter of which is incorporated herein by reference.

This application is a continuation-in-part (CIP) of U.S. Patent application for an "In-cell touch display structure", U.S. application Ser. No. 14/493,784, filed on Sep. 23, 2014.

BACKGROUND OF THE INVENTION

1. Field of the Invention

The present invention relates to a display screen structure with a touch panel and, more particularly, to an in-cell touch display structure.

2. Description of Related Art

Modern consumer electronic apparatuses are typically equipped with touch panels for use as their input devices. According to different sensing manners, the touch panels can be classified into resistive type, capacitive type, acoustic type, and optical type.

A conventional touch display panel includes a touch panel and a display unit overlapped with the touch panel. The touch panel is configured as an operation interface. The touch panel is transparent so that an image generated by the display unit can be viewed directly by a user without being sheltered by the touch panel. Such well-known skill of the touch panel may increase additional weight and thickness of the touch display panel, and may further reduce the light penetration rate, and increase reflectance and haze of the touch display panel.

On-cell and in-cell touch technologies were invented to overcome the drawbacks of traditional touch technology described above. The on-cell technology is to dispose sensors on the back side of a color filter substrate to form a completed color filter substrate. One of the on-cell touch technologies is provided to dispose touch sensors on a thin film and then bond the thin film onto the upper one of the two substrates.

The in-cell technology is to dispose the sensors within the LCD cell structure. Currently, there are resistive, capacitive and optical three primary in-cell touch technologies, wherein the resistive touch technology employs two conductive substrates and the voltage variation of a common layer between the two substrates for determining a touch position on the touch display panel.

The in-cell touch technology is provided to integrate the touch sensor within the display unit so that the display unit is provided with the ability of the touch panel. Therefore, the touch display panel does not need to be bonded with an additional touch panel so as to simplify the assembly procedure. Such skill is generally developed by display panel manufactures.

There is older touch control technology known as out-cell, which is typically applied to the resistive and capacitive touch panels. The out-cell touch technology is provided to add a touch module onto a display module. The touch module and the display module can be manufactured by the two separated firms.

However, for all the in-cell, on-cell and out-cell touch technologies, they all need a sensing electrode layer made of transparent material (Indium Tin Oxide, ITO) to be configured on an upper or lower glass substrate, which not only increases the manufacturing cost but also complicates the manufacturing process, and which may also lower the aperture ratio and thus need to increase the strength of backlight, resulting in huge power consumption which is disadvantageous to make the mobile device compact. Therefore, it desired for the aforementioned touch display panel structure to be improved.

SUMMARY OF THE INVENTION

The object of the present invention is to provide an in-cell touch display structure capable of greatly reducing the material cost and the manufacturing cost. Because there is no need to provide a sensing electrode layer made of ITO material on an upper or lower glass substrate of a display panel, the manufacturing cost can be reduced and manufacturing process can be simplified.

To achieve the object, there is provided an in-cell touch display structure, which comprises: an upper substrate; a lower substrate parallel to the upper substrate; a display material layer configured between the upper substrate and the lower substrate; and a thin film transistor and sensing electrode layer disposed at one side of the lower substrate facing display material layer. The thin film transistor and sensing electrode layer includes: a gate line sub-layer, having a plurality of gate lines arranged in a first direction, and a plurality of first sensing conductor segments arranged in a second direction, the plurality of first sensing conductor segments being separated by the plurality of gate lines; and a source line sub-layer disposed at one side of the gate line sub-layer facing the display material layer and having a plurality of source lines arranged in the second direction, a plurality of second sensing conductor segments arranged in the first direction, and a plurality of connection traces arranged in the second direction and parallel to the plurality of source lines, the plurality of second sensing conductor segments being separated by the plurality of source lines and the plurality of connection traces. The plurality of first sensing conductor segments are electrically connected to the plurality of second sensing conductor segments for forming a plurality of sensing conductor blocks.

DETAILED DESCRIPTION OF THE PREFERRED EMBODIMENT

Figure 1:
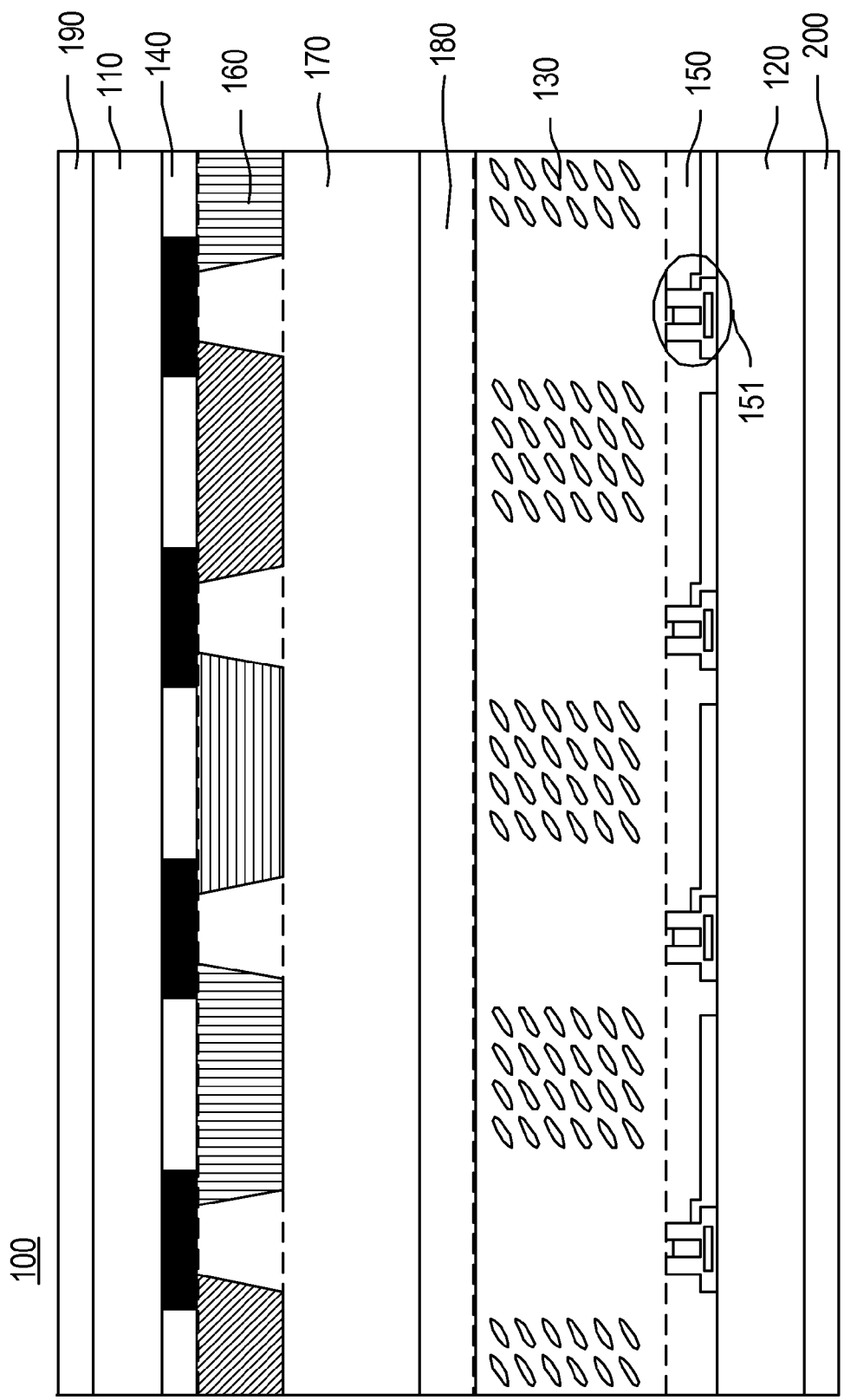
FIG. 1 shows a stack-up diagram of an in-cell touch display structure for an embodiment.

With reference to FIG. 1, there is shown an in-cell touch display structure 100 according to a preferred embodiment of the present invention, which includes an upper substrate 110, a lower substrate 120, a display material layer 130, a black matrix layer 140, a thin film transistor and sensing electrode layer 150, a color filter layer 160, an overcoat layer 170, a common voltage (Vcom) layer 180, an upper polarizer layer 190, and a lower polarizer layer 200.

The upper substrate 110 and the lower substrate 120 are preferably glass substrates and are parallel to each other. The display material layer 130 is disposed between the upper and lower substrates 110, 120.

The black matrix layer 140 is disposed on one side of the upper substrate 110 that faces the display material layer 130, and is composed of a plurality of opaque conductor lines.

Figure 2:
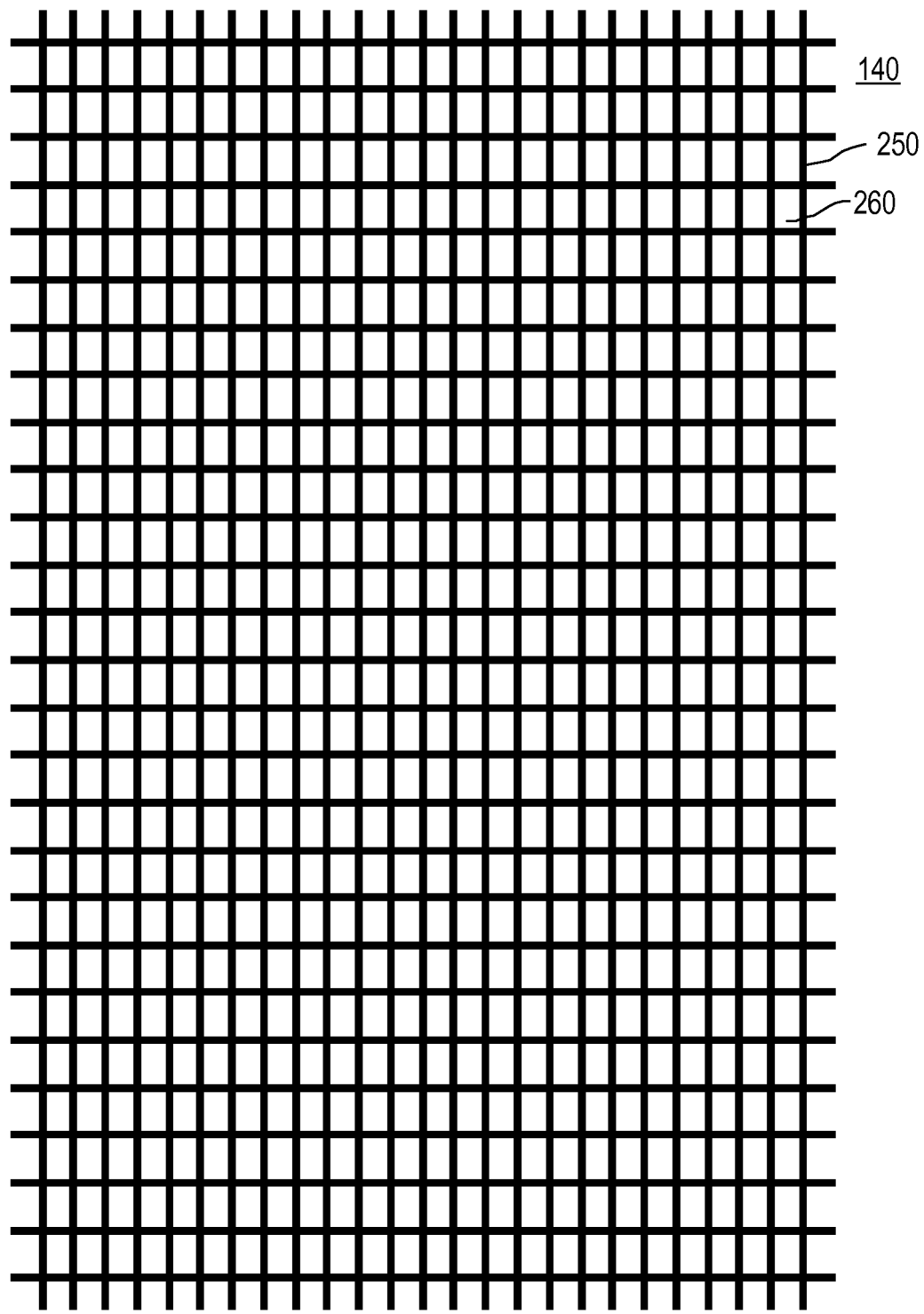
FIG. 2 is a schematic diagram of the black matrix layer.

FIG. 2 schematically illustrates the black matrix layer 140, which is the same as that of the prior LCD device. As shown in FIG. 2, the black matrix layer 140 is composed of a plurality of opaque lines 250 of insulating material that are black and opaque. The plurality of lines 250 of black insulating material are arranged as a checkerboard pattern and the color filter is disposed at the spaces 260 among those opaque lines 250 of black insulating material.

In prior LCD panel structure, the thin film transistor layer is disposed at one side of the lower substrate (120) that faces the display material layer (130). The prior thin film transistor layer is composed of thin film transistors (151) and transparent electrodes.

In the present invention, a plurality of first sensing conductor segments, a plurality of second sensing conductor segments and a plurality of connection traces are provided on the prior thin film transistor layer, wherein part of the plurality of first sensing conductor segments is electrically connected to part of the plurality of second sensing conductor segments, so as to form a plurality of sensing conductor blocks, and the plurality of connection traces are respectively electrically connected to the plurality of sensing conductor blocks for transmitting the sensing electric signal sensed by each sensing conductor block of the plurality sensing conductor blocks, thereby forming the thin film transistor and sensing electrode layer 150 in accordance with the present invention. Therefore, there is no need to arrange a sensing electrode layer on the upper glass substrate or the lower glass substrate of an LCD display panel, so as to reduce the manufacturing cost, simplify the manufacturing process and increase the yield rate.

The thin film transistor and sensing electrode layer 150 is disposed at one side of the lower substrate 120 that faces the display material layer 130, wherein the thin film transistor and sensing electrode layer 150 includes a gate line sub-layer and a source line sub-layer.

Figure 3:
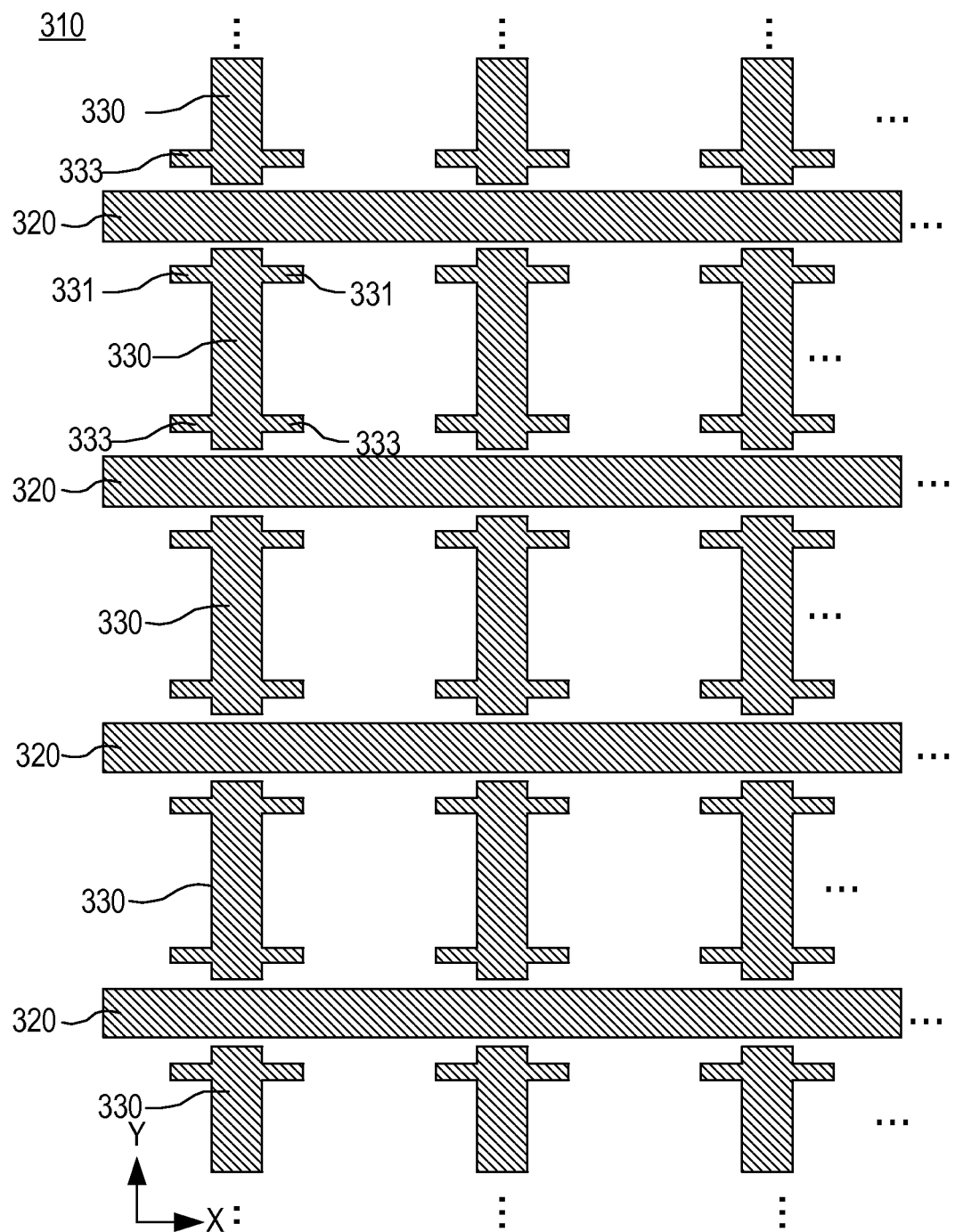
FIG. 3 is a schematic diagram of the gate line sub-layer of the in-cell touch display structure in accordance with the present invention.

FIG. 3 is a schematic diagram of the gate line sub-layer 310 in accordance with the present invention. The gate line sub-layer 310 is composed of a plurality of gate lines 320 and a plurality of first sensing conductor segments 330. The plurality of gate lines 320 are arranged in a first direction (X-axis direction) and the plurality of first sensing conductor segments 330 are arranged in a second direction (Y-axis direction) The first sensing conductor segments 330 arranged in the second direction are separated by the plurality of gate lines 320. Each of the first sensing conductor segments 330 arranged in the second direction includes two ends respectively having a first extension part 331 and a second extension part 333 arranged in the first direction, in which the first direction is substantially vertical to the second direction.

Figure 4:
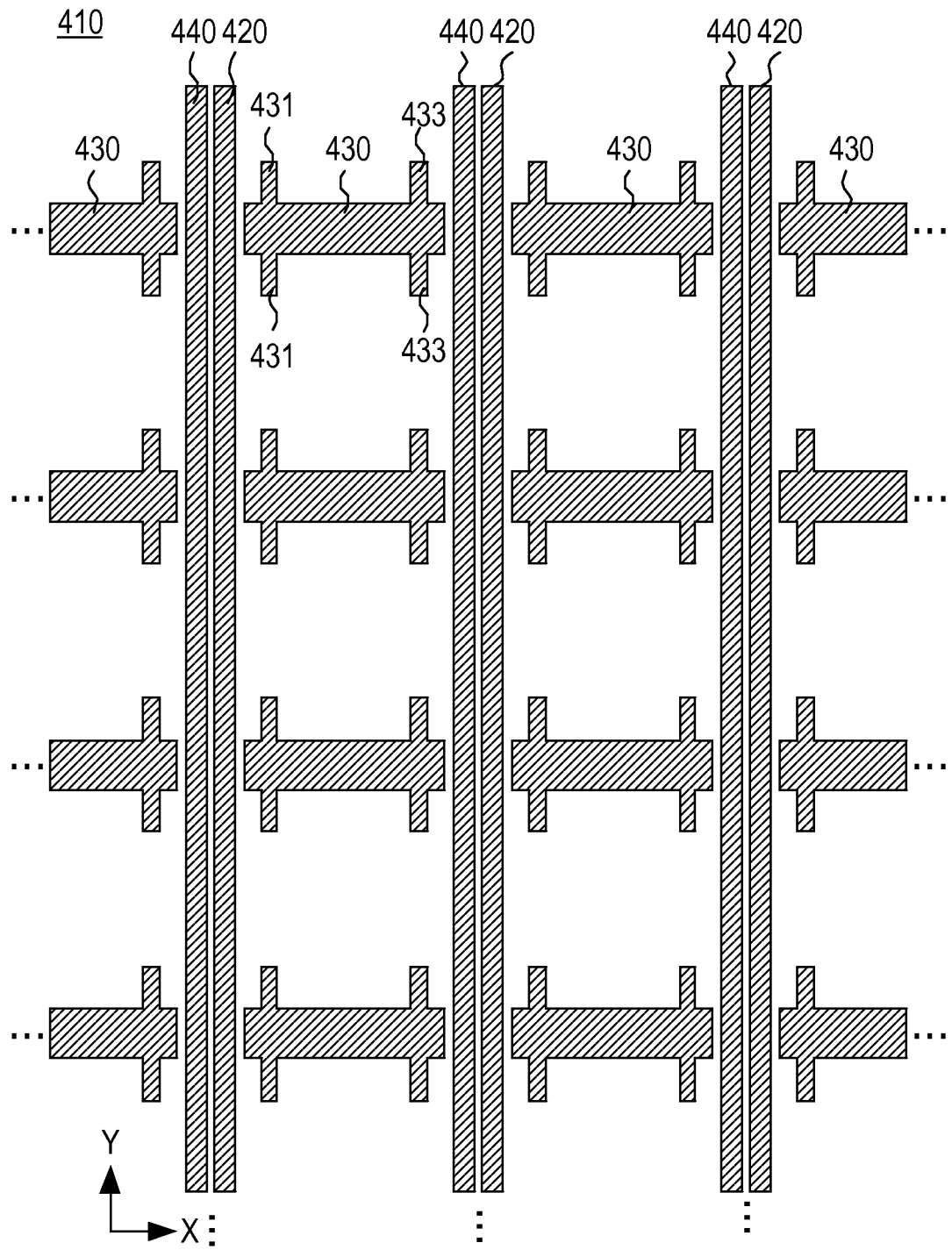
FIG. 4 is a schematic diagram of the source line sub-layer of the in-cell touch display structure in accordance with the present invention.

FIG. 4 a schematic diagram of the source line sub-layer 410 in accordance with the present invention. The source line sub-layer 410 is disposed at one side of the gate line sub-layer 310 facing the display material layer 130 and has a plurality of source lines 420, a plurality of second sensing conductor segments 430, and a plurality of connection traces 440. The plurality of source lines 420 are arranged in a second direction. The plurality of connection traces 440 are arranged in a second direction and in parallel with the plurality of source lines 420. The plurality of second sensing conductor segments 430 are arranged in a first direction. The plurality of second sensing conductor segments 430 arranged in a first direction are separated by the plurality of source lines 420 and the plurality of connection traces 440. Each of the second sensing conductor segments 430 arranged in the first direction includes two ends respectively having a first extension part 431 and a second extension part 433 arranged in the second direction.

The plurality of second sensing conductor segments 430 and the plurality of first sensing conductor segments 330 are disposed at positions corresponding to the positions of the plurality of gate lines 320, the plurality of source lines 420, and the plurality of connection traces 440. Part of the plurality of second sensing conductor segments 430 and part of the plurality of first sensing conductor segments 330 are electrically connected, so as to form a plurality of sensing conductor blocks, wherein each of the plurality of sensing conductor blocks is a mesh-like polygon region, which is preferably of a rectangle shape.

Figure 5:
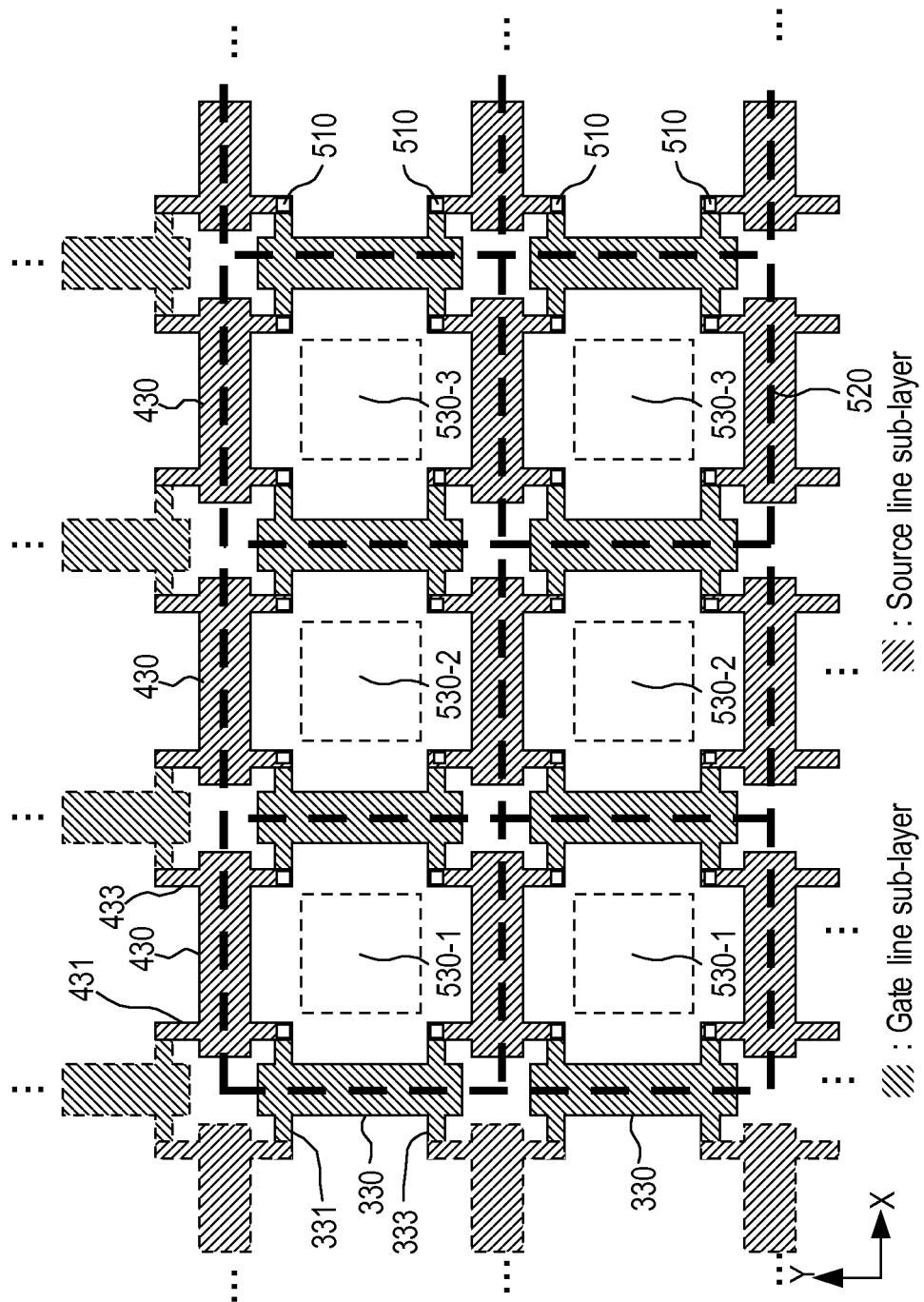
FIG. 5 schematically illustrates the electrical connection between the first sensing conductor segments and the second sensing conductor segments in accordance with the present invention.

FIG. 5 schematically illustrates the electrical connection between the first sensing conductor segments 330 and the second sensing conductor segments 430. The first sensing conductor segments 330 and the second sensing conductor segments 430 are disposed at different layers, respectively, wherein the extension parts 331, 333, 431, 433 are partially overlapped and can be electrically connected through via 510, so as to form a plurality of sensing conductor blocks 520.

In the present invention, the plurality of first sensing conductor segments 330 are disposed at the same positions of the source lines 420, but on different layers. Similarly, the second sensing conductor segments 430 are disposed at the same positions of the gate lines 320, but on different layers. That is, the plurality of first sensing conductor segments 330 and the plurality of second sensing conductor segments 430 are disposed at positions corresponding to the positions of the plurality of source lines 420 and the plurality of gate lines 320. Part of the plurality of first sensing conductor segments 330 and part of the plurality of second sensing conductor segments 430 are electrically connected, so as to form a plurality of sensing conductor blocks 520, wherein each of the plurality of sensing conductor blocks 520 is a mesh-like polygon region, which is preferably of a rectangle shape. That is, the plurality of first sensing conductor segments 330 and the plurality of second sensing conductor segments 430 are disposed at positions corresponding to the positions of the plurality of source lines 420 and the plurality of gate lines 320.

The sensing conductor block 520 includes a plurality of sub-pixel regions 530. As shown in FIG. 5, the sensing conductor block 520 includes red sub-pixel regions 530-1, blue sub-pixel regions 530-2, and green sub-pixel regions 530-3. It is noted that the second sensing conductor segments 430, the first sensing conductor segments 330, and the sub-pixel regions 530, as shown in FIG. 5, are for illustrative purpose only, but not in actual scale and ratio.

The plurality of first sensing conductor segments 330, the plurality of second sensing conductor segments 430 and the plurality of connection traces 440 are made of conductive metal material, wherein the conductive metal material is selectively to be chromium, barium, aluminum, silver, copper, titanium, nickel, tantalum, cobalt, tungsten, magnesium, calcium, potassium, lithium, indium, and alloy thereof, or mixture of lithium fluoride, magnesium fluoride, oxide and aluminum.

Figure 6:
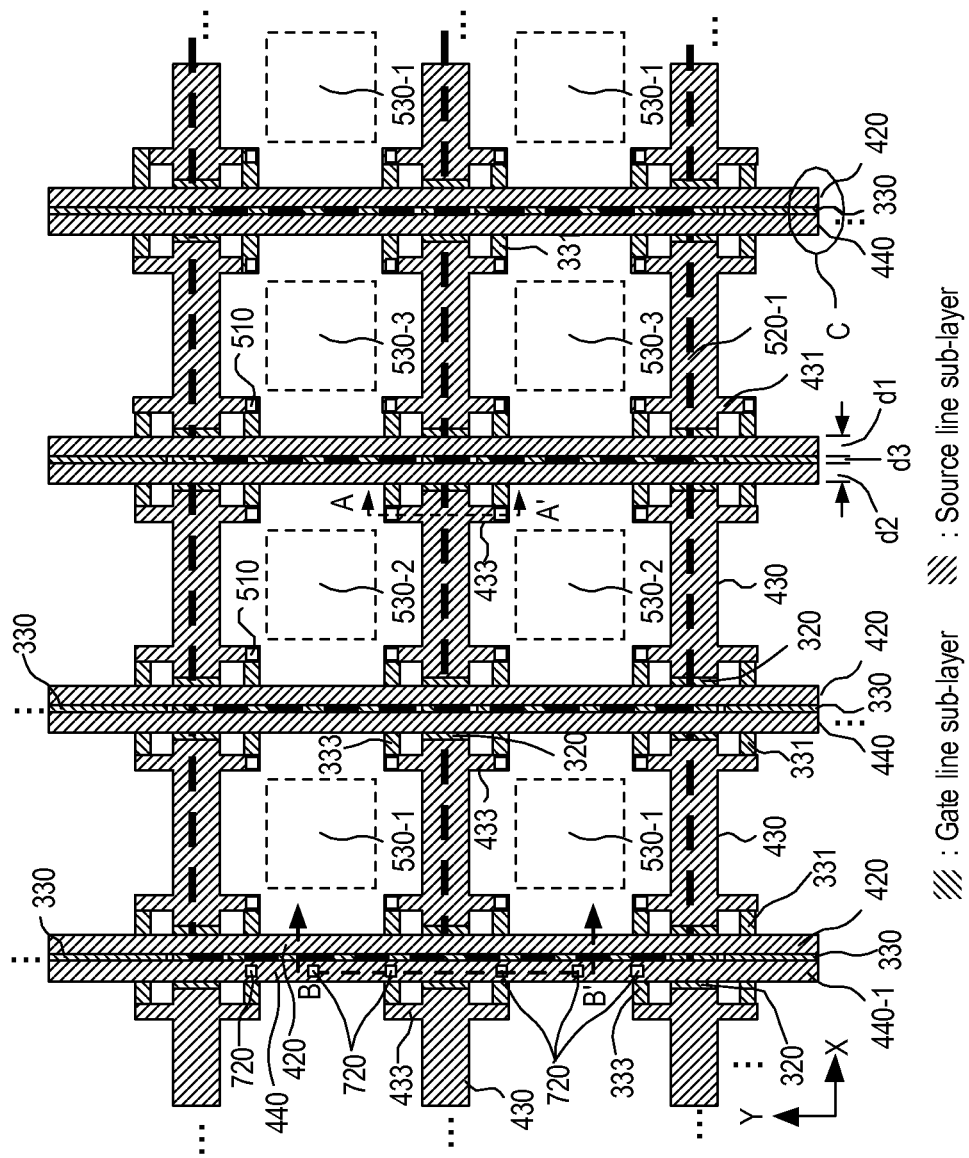
FIG. 6 schematically illustrates an electrical connection between the gate line sub-layer and the source line sub-layer in accordance with the present invention.

FIG. 6 schematically illustrates an electrical connection between the gate line sub-layer 310 and the source line sub-layer 410, which is viewed from the upper substrate 110 to the lower substrate 120.

The plurality of connection traces 440 are electrically connected to the plurality of sensing conductor blocks 520, respectively, so as to transmit the electrical signal sensed by each sensing conductor block of the plurality sensing conductor block 520. As shown in FIG. 6, the connection trace 440-1 and the first sensing conductor segment 330 of the sensing conductor block 520-1 are partially overlapped and thus can be electrically connected through the plurality of vias 720, so as to form the wiring of the sensing conductor block 520-1 for transmitting the electrical signal sensed by the sensing conductor block 520-1. In FIG. 6, only the connection trace 440-1 and the sensing conductor block 520-1 are electrically connected, while other connection traces 440 are not electrically connected with the sensing conductor block 520-1, so that there is no via 720 arranged in the other connection traces 440.

Figure 7A:
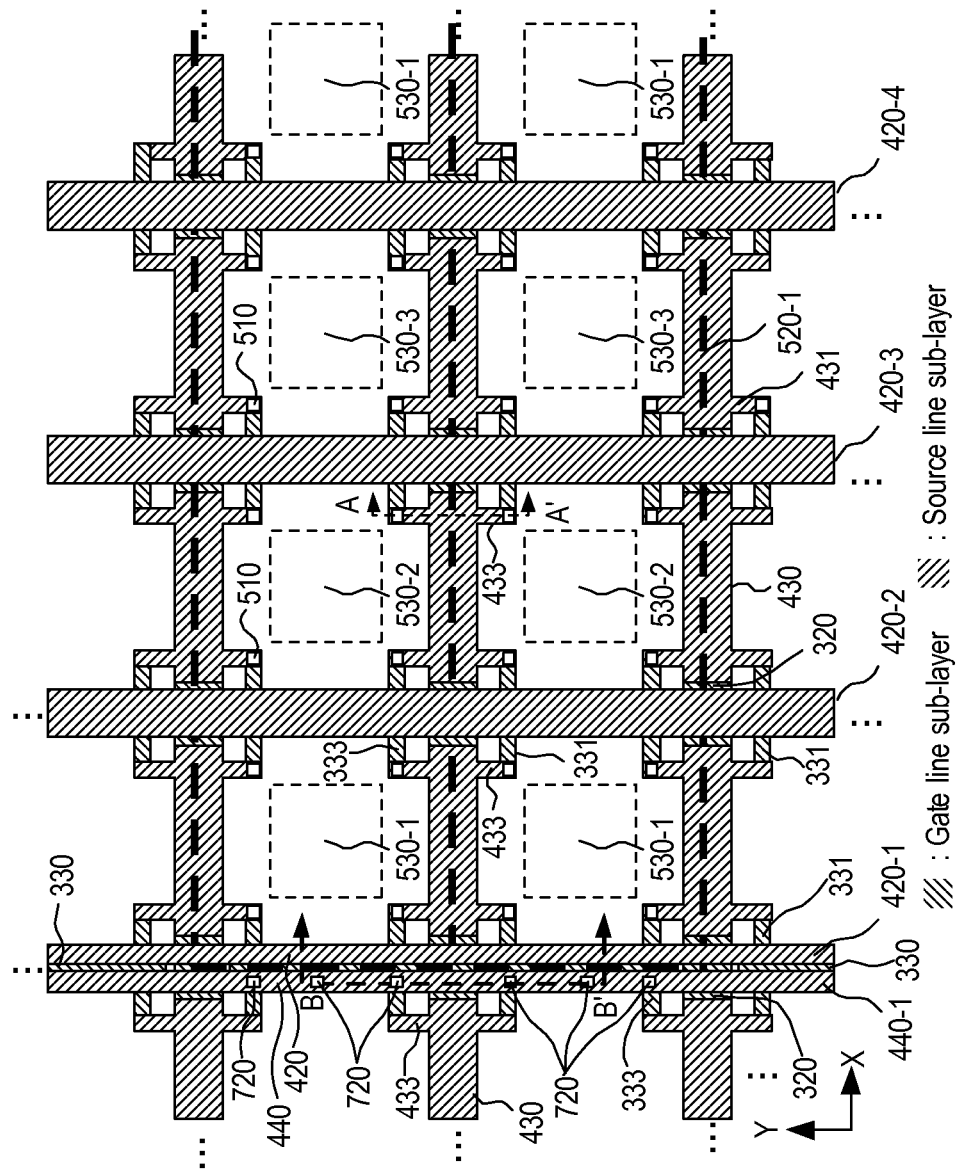
FIG. 7A schematically illustrates another electrical connection between the gate line sub-layer and the source line sub-layer in accordance with the present invention.

FIG. 7A schematically illustrates another electrical connection between the gate line sub-layer 310 and the source line sub-layer 410, which is similar to FIG. 6 except that, because the other connection traces 440 of FIG. 6 are not electrically connected with the sensing conductor block 520-1, these connection traces 440 are omitted in FIG. 7 and the widths of the corresponding source lines are augmented. In this embodiment, the connection trace 440-1 is preferably arranged in the red sub-pixel region 530-1. That is, the width of the source line 420-1 corresponding to the red sub-pixel region 530-1 is smaller than the width of each of other source lines 420-2, 420-3, 420-4.

Figure 7B:
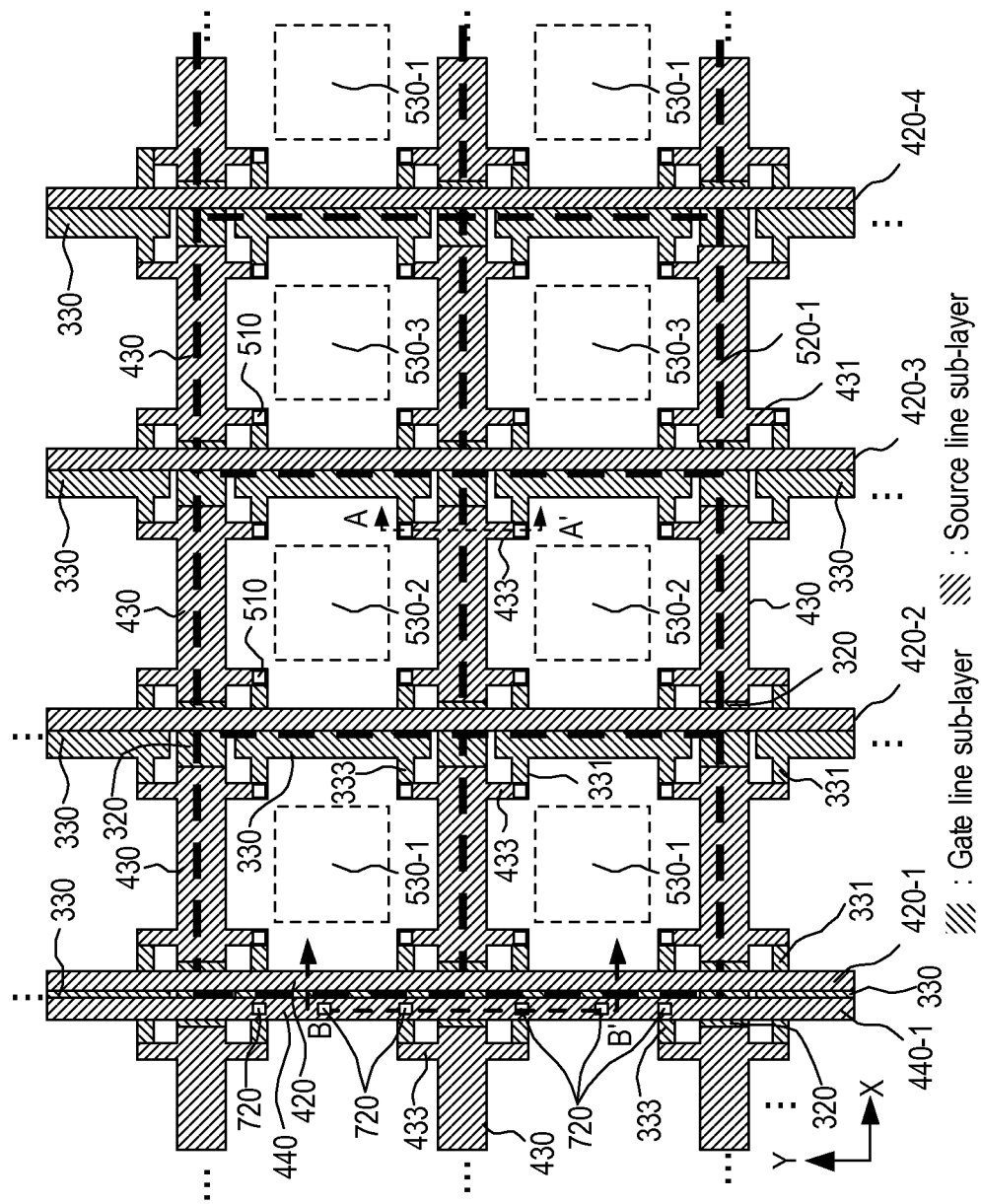
FIG. 7B schematically illustrates a further electrical connection between the gate line sub-layer and the source line sub-layer in accordance with the present invention.

FIG. 7B schematically illustrates a further electrical connection between the gate line sub-layer 310 and the source line sub-layer 410, which is similar to FIG. 7A except that the width of the source line 420-1 corresponding to the red sub-pixel region 530-1 is equal to the width of each of other source lines 420-2, 420-3, 420-4.

As shown in FIG. 6, the line width of the sensing conductor segment 430 is equal to the line width of the gate line 320. The line width of the first connection segment 330 is equal to the summation of the line width (d1) of the source line 420, the line width (d2) of the connection trace 440 and a gap (d3) between the source line 420 and the connection trace 440. It is noted that, at the place labeled by an ellipse C, the first connection segment 330 can be seen as there is a gap (d3) between the source line 420 and the connected trace 440.

In the prior art, the gate lines and the source lines are disposed underneath the opaque lines of the black matrix layer. In the present invention, the plurality of first sensing conductor segments 330 arranged in the second direction are disposed at positions corresponding to the positions of the plurality of source lines 420 and the plurality of connection traces 440, and the plurality of second sensing conductor segments 430 arranged in the first direction are disposed at positions corresponding to the positions of the plurality of gate lines 320. That is, the plurality of opaque lines 250 of the black matrix layer 140 are disposed at positions corresponding to the positions of the plurality of gate lines 320, the plurality of source lines 420, and the plurality of connection traces 440. Therefore, the plurality of first sensing conductor segments 330 arranged in the second direction and the plurality of second sensing conductor segments 430 arranged in the first direction are also shielded by the plurality of opaque lines 250. That is, when viewing from the upper substrate 110 to the lower substrate 120, the second sensing conductor segments 430 arranged in the first direction, the first sensing conductor segments 330 arranged in the second direction, the gate lines 320, the source lines 420, and the connection traces 440 are shielded by the opaque lines 250, so that they cannot be seen by users.

Figure 8A:
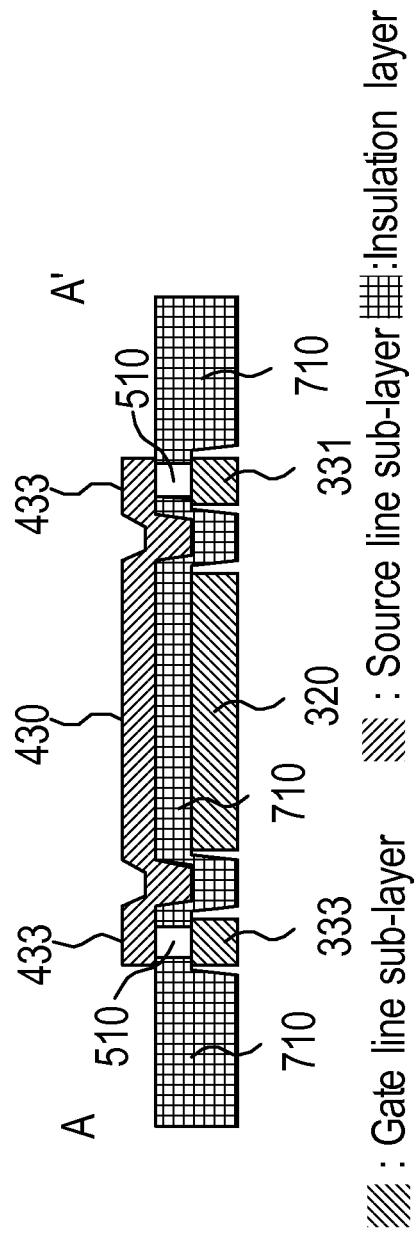
FIG. 8A and FIG. 8B are two cross sectional views taking along A-A' and B-B' lines of FIG. 6, respectively.
Figure 8B:
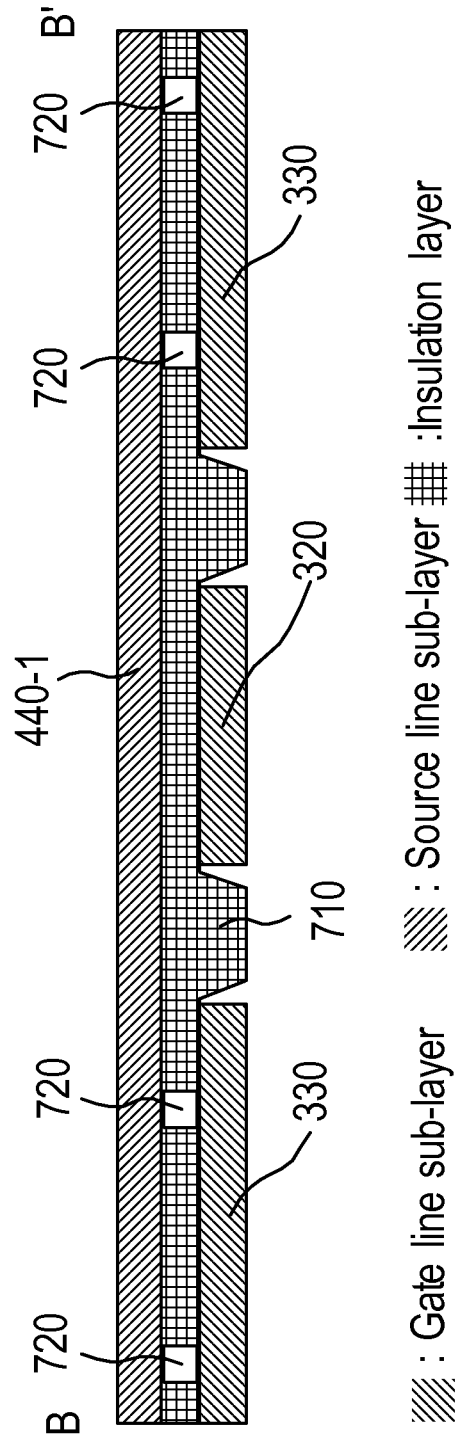

FIG. 8A and FIG. 8B are two cross sectional views taking along A-A' and B-B' lines of FIG. 6, respectively. As shown in FIG. 8A, there is an insulation layer 710 arranged between the gate line 320 and the second sensing conductor segment 430 as well as the second extension part 433 arranged in the second direction. The second extension part 433 arranged in the second direction is electrically connected to the first extension part 331 arranged in the first direction and the second extension part 333 arranged in the first direction through via 510. As shown in FIG. 8B, there is an insulation layer 710 arranged between the gate line 320 and the connection trace 440-1. The connection trace 440-1 and the first sensing conductor segments 330 of sensing conductor block 520-1 are partially overlapped and thus can be electrically connected through the plurality of vias 720.

From FIGS. 3, 4, 5, 6, 7, 8A and 8B, it is known that the plurality of second sensing conductor segments 430 and the plurality of first sensing conductor segments 330 can form the plurality of sensing conductor blocks 520. Further, the plurality of connection traces 440 are used as wirings connected to the plurality of sensing conductor blocks 520, respectively, for forming a self-capacitance touch detection plane in the thin film transistor and sensing electrode layer 150, so as to detect finger's or object's touch.

Figure 9:
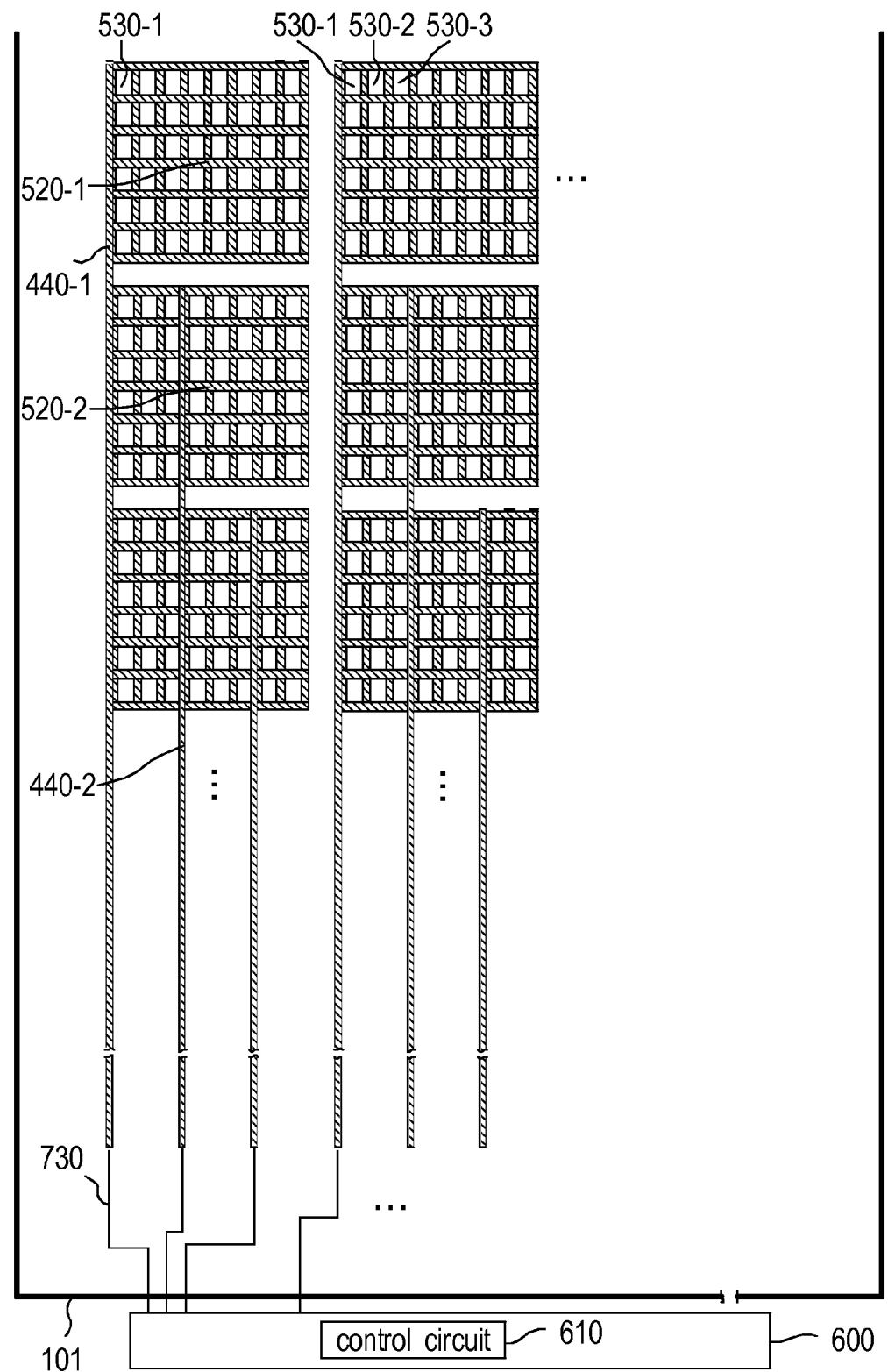
FIG. 9 is a schematic diagram of the sensing conductor blocks in accordance with the present invention.

FIG. 9 is a schematic diagram of the sensing conductor blocks in accordance with the present invention. As shown, the sensing conductor block 520-1 is extended downward through a connection trace 440-1 and is further extended down to one edge 101 of the in-cell touch display structure 100 through a wiring 730 for connecting to the control circuit 610 of a flexible circuit board 600.

As shown in FIG. 7 and FIG. 9, in this embodiment, the connection trace 440-1 is preferably arranged in the red sub-pixel region 530-1, and the width of the source line 420-1 corresponding to the red sub-pixel region 530-1 is smaller than the width of other source lines 420-2, 420-3, 420-4. In other embodiments, the widths of the connection trace 440-1 and the source line 420-1 can be increased. When the widths of the connection trace 440-1 and the source line 420-1 are increased, one approach is to reduce the red sub-pixel region 530-1, and electronic circuit, such as driving circuit, in the control circuit 610 is employed to adjust and compensate the detected electrical signal. Another approach is to increase the spacing between the red sub-pixel region 530-1 and the green sub-pixel region 530-3 at its left side, so as to accommodate the wider connection trace 440-1 and the source line 420-1.

The color filter layer 160 is arranged on one side of the black matrix layer 140 that faces the display material layer 130. The common electrode layer 180 is disposed between the upper substrate 110 and the lower substrate 120. The upper polarizer layer 190 is arranged on the upper substrate 110 side facing away from the display material layer 130. The lower polarizer layer 200 is arranged on the lower substrate 120 side facing away from the display material layer 130.

Figure 10:
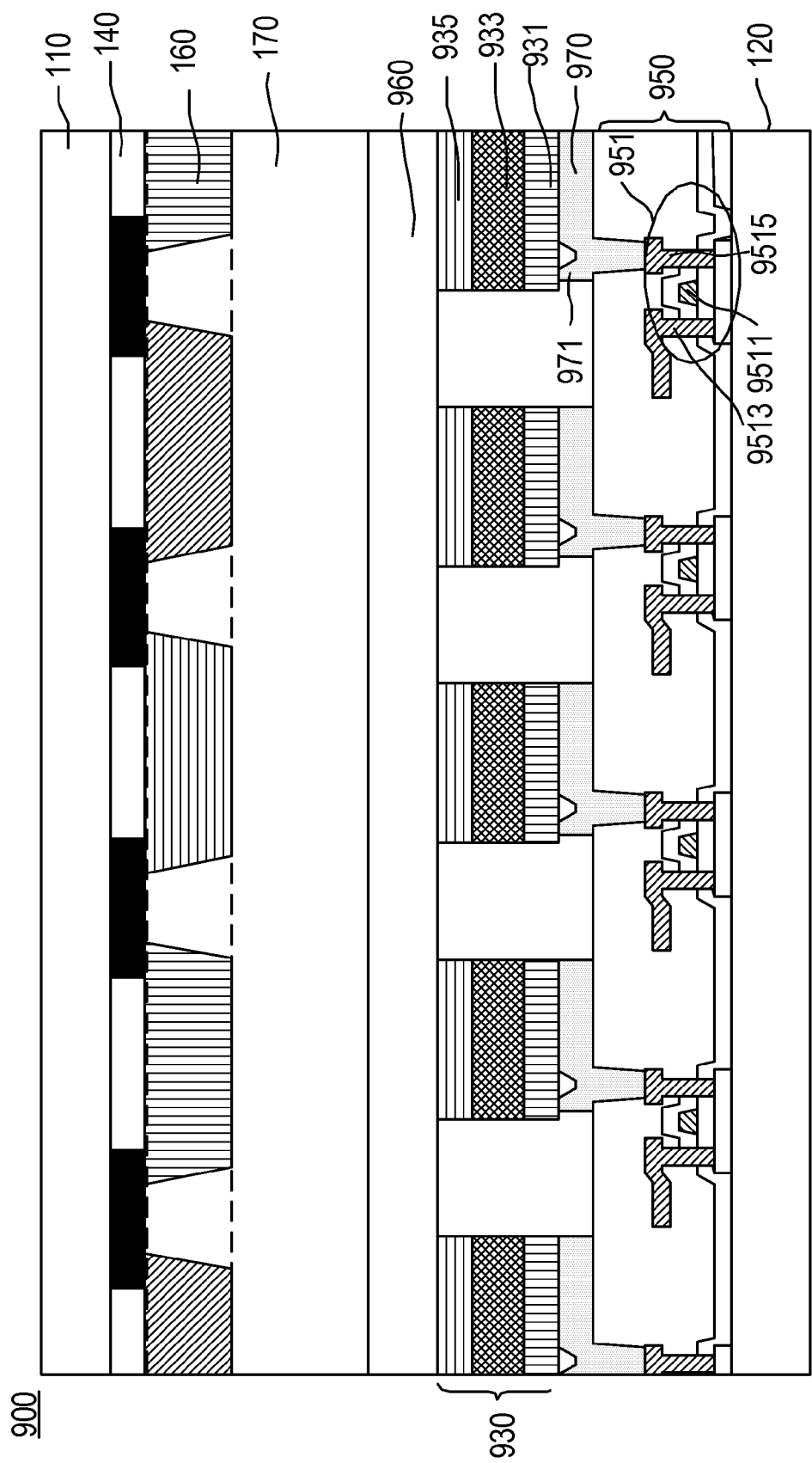
FIG. 10 is a stack-up diagram of the in-cell touch display structure in accordance with another embodiment of the present invention.

FIG. 10 is a stack-up diagram of the in-cell touch display structure in accordance with another embodiment of the present invention. As shown, the in-cell touch display structure 900 includes an upper substrate 110, a lower substrate 120, a display material layer 930, a black matrix layer 140, a thin film transistor and sensing electrode layer 950, a color filter layer 160, an overcoat layer 170, a cathode layer 960, and an anode layer 970.

FIG. 10 is similar to FIG. 1 except for the display material layer 930, the cathode layer 960, the anode layer 970, and the thin film transistor and sensing electrode layer 950.

The upper substrate 110 and the lower substrate 120 are preferably glass substrates or plastic substrates and are parallel to each other. The display material layer 930 is disposed between the upper and lower substrates 110, 120, wherein the display material layer 930 is preferably an organic light emitting diode (OLED) layer.

In this embodiment, a plurality of second sensing conductor segments 430, a plurality of connection traces 440, and a plurality of first sensing conductor segments 330 are provided on the prior thin film transistor layer, and part of the plurality of second sensing conductor segments 430 is electrically connected with part of the plurality of first sensing conductor segments 330 to form a plurality of sensing conductor blocks 520, wherein the plurality of connection traces 440 are electrically connected to the plurality of sensing conductor blocks 520, respectively, for transmitting the electrical signal sensed by each of the sensing conductor blocks 520, thereby forming the thin film transistor and sensing electrode layer 950 in accordance with the present invention. Therefore, there is no need to arrange a sensing electrode layer made of transparent material on the upper glass substrate or the lower glass substrate of a display panel, so as to reduce the manufacturing cost, simplify the manufacturing process and increase the yield rate.

The details for the plurality of second sensing conductor segments 430, the plurality of connection traces 440 and the plurality of first sensing conductor segments 330 can be found in the disclosure of the first embodiment and FIGS. 3-9, and thus a detailed description therefor is deemed unnecessary.

The thin film transistor and sensing electrode layer 950 is disposed on one side of the lower substrate 120 that faces the display material layer 930. The thin film transistor and sensing electrode layer 950 includes a plurality of gate lines (not shown), a plurality of source lines (not shown), a plurality second sensing conductor segments (not shown) arranged in the first direction, a plurality of first sensing conductor segments and the plurality of connection traces 440 arranged in the second direction, and a plurality of pixel driving circuits 951, each corresponding to a pixel, so as to drive a corresponding pixel driving circuit 951 based on a display pixel signal and a display driving signal thereby performing a display operation.

According to different designs of the pixel driving circuit 951, such as 2T1C being a pixel driving circuit formed with two thin film transistors and a storage capacitor, and 6T2C being a pixel driving circuit formed with six thin film transistors and two storage capacitors, the gate 9511 of at least one thin film transistor in the pixel driving circuit 951 is connected to a gate line (not shown). According to different designs of driving circuit, a source/drain 9513 of at least one thin film transistor in a control circuit is connected to a source line (not shown) and a source/drain 9515 of at least one thin film transistor in pixel driving circuit 951 is connected to a corresponding anode pixel electrode 971 of the anode layer 970.

The cathode layer 960 is disposed at one side of the upper substrate 110 facing the display material layer 930 and between the upper substrate 110 and the display material layer 930. The cathode layer 960 is formed with metal material, preferably metal material with thickness being less than 50 nm. The metal material is selectively to be alloy of aluminum, silver, magnesium, calcium, potassium, lithium, indium, and alloy thereof, or mixture of lithium fluoride, magnesium fluoride, lithium oxide and aluminum. Due to the thickness of the cathode layer 960 being less than 50 nm, the light generated by the display material layer 930 can pass through the cathode layer 960, so as to show images on the upper substrate 110. The cathode layer 960 is intact piece electrical connection, so that it can be used as a shielding. Moreover, the cathode layer 960 also receives the current coming from the anode pixel electrode 971.

The anode layer 970 is disposed at one side of the thin film transistor and sensing electrode layer 950 facing the display material layer 930. The anode layer 970 includes a plurality of anode pixel electrodes 971. Each of the anode pixel electrodes 971 is corresponding to one pixel driving transistor of the pixel driving circuit 951 of the thin film transistor and sensing electrode layer 950. That is, each of the anode pixel electrodes is connected to a source/drain of the pixel driving transistor of the corresponding pixel driving circuit 951, so as to form a pixel electrode of a specific color, for example a red pixel electrode, a green pixel electrode, or a blue pixel electrode.

The display material layer 930 includes a hole transporting layer 931, an emitting layer 933, and an electron transporting layer 935. The display material layer 930 is preferably emitting white light, and using the color filter layer 160 to filter out and to generate red, blue, green primary colors.

Figure 11:
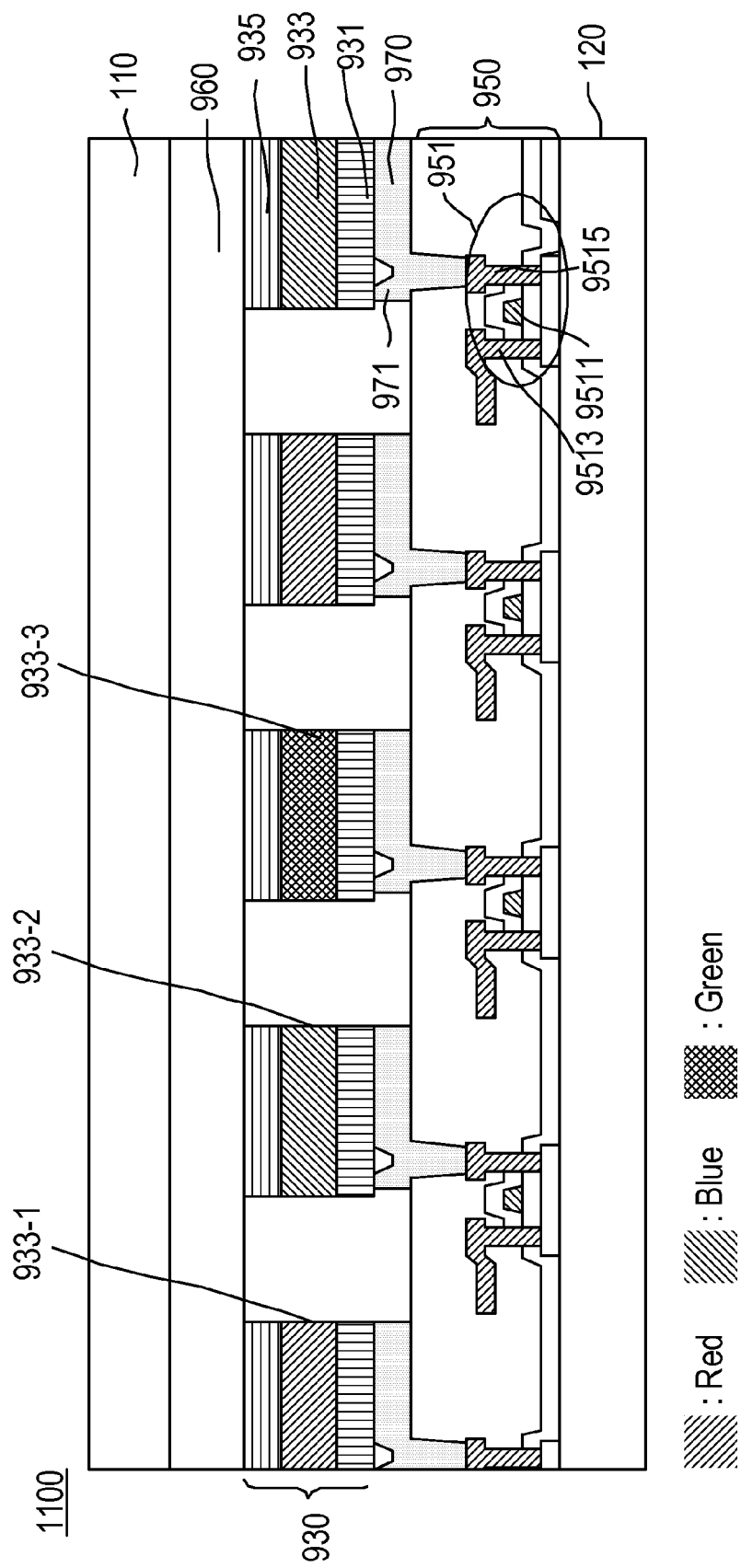
FIG. 11 is a stack-up diagram of the in-cell touch display structure in accordance with still another embodiment of the present invention.

FIG. 11 is a stack-up diagram of the in-cell touch display structure in accordance with still another embodiment of the present invention. As shown, the in-cell touch display structure 1100 includes an upper substrate 110, a lower substrate 120, a display material layer 930, a thin film transistor and sensing electrode layer 950, a cathode layer 960, and an anode layer 970. FIG. 11 is similar to FIG. 10 except that, in FIG. 11, a red light emitting layer 933-1, a blue light emitting layer 933-2 and a green light emitting layer 933-3 are employed so that there is no need to use the black matrix layer 140, the color filter layer 160 and the over coat layer 170.

In the prior art, the electrode pads made of ITO have an average light penetration rate of about 90%. In the present invention, the source lines 420, the connection traces 440, the gate lines 320 and the plurality of sensing conductor blocks 520 are disposed at positions corresponding to the positions of the prior gate lines and source lines, so that the light penetration rate is not influenced. Therefore, the light penetration rate of the present invention is much better than that of the prior art. Accordingly, in comparison with the prior touch display panel, the in-cell touch display structure in accordance with the present invention shall have a higher brightness.

In view of the forgoing, it is known that the present invention is able to form the sensing conductor blocks 520 and the connected traces 440 arranged in the second direction on the thin film transistor and sensing electrode layer 150, so that there is no need to manufacture a sensing electrode layer made of ITO material on the upper glass substrate or lower glass substrate of the display panel thereby reducing the manufacturing cost and decreasing the manufacturing process.

Moreover, the plurality of first sensing conductor segments 330 arranged in the second direction of the present invention can also be defined on the mask for defining the prior gate lines 320, and the plurality of second sensing conductor segments 430 arranged in the first direction and the plurality of connected traces 440 arranged in the second direction of the present invention can also be defined on the mask for defining the prior source lines 420. Therefore, there is no extra manufacturing process required; i.e., the display panel is provided with touch control function without introducing new process.

Although the present invention has been explained in relation to its preferred embodiment, it is to be understood that many other possible modifications and variations can be made without departing from the spirit and scope of the invention as hereinafter claimed.

What is claimed is:

1. An in-cell touch display structure, comprising:
   an upper substrate;
   a lower substrate parallel to the upper substrate;
   a display material layer configured between the upper substrate and the lower substrate; and
   a thin film transistor and sensing electrode layer disposed at one side of the lower substrate facing display material layer, wherein the thin film transistor and sensing electrode layer includes:
   a gate line sub-layer having a plurality of gate lines arranged in a first direction, and a plurality of first sensing conductor segments arranged in a second direction, the plurality of first sensing conductor segments being separated by the plurality of gate lines; and
   a source line sub-layer disposed at one side of the gate line sub-layer facing the display material layer and having a plurality of source lines arranged in the second direction, a plurality of second sensing conductor segments arranged in the first direction, and a plurality of connection traces arranged in the second direction and parallel to the plurality of source lines, the plurality of second sensing conductor segments being separated by the plurality of source lines and the plurality of connection traces,
   wherein the plurality of first sensing conductor segments are electrically connected to the plurality of second sensing conductor segments for forming a plurality of sensing conductor blocks, and
   wherein the plurality of connection traces are connected to the plurality of sensing conductor blocks, respectively, for transmitting electric signal sensed by each of the plurality sensing conductor blocks.

2. The in-cell touch display structure as claimed in claim 1, wherein the plurality of second sensing conductor segments and the plurality of first sensing conductor segments are disposed at positions corresponding to those of the plurality of gate lines, the plurality of source lines, and the plurality of connection traces.

3. The in-cell touch display structure as claimed in claim 2, wherein the plurality of second sensing conductor segments, the plurality of first sensing conductor segments, and the plurality of connection traces are made of conductive metal material or alloy thereof.

4. The in-cell touch display structure as claimed in claim 3, wherein the conductive metal material is selectively to be chromium, barium, aluminum, silver, copper, titanium, nickel, tantalum, tungsten, magnesium, calcium, potassium, lithium, indium, and alloy thereof, mixture of lithium fluoride, magnesium fluoride, oxide and aluminum.

5. The in-cell touch display structure as claimed in claim 4, wherein each of the plurality sensing conductor block is a mesh-like polygon region.

6. The in-cell touch display structure as claimed in claim 5, wherein each of the plurality of first sensing conductor segments includes two ends respectively having a first extension part and a second extension part arranged in the first direction, and each of the plurality of second sensing conductor segments includes two ends respectively having a first extension part and a second extension part arranged in the second direction, the first extension part and the second extension part arranged in the first direction and the first extension part and the second extension part arranged in the second direction being partially overlapped.

7. The in-cell touch display structure as claimed in claim 6, wherein the first extension part and the second extension part arranged in the first direction and the first extension part and the second extension part arranged in the second direction are partially overlapped for being electrically connected, and the plurality of second sensing conductor segments and the plurality of first sensing conductor segments are provided to form the plurality of sensing conductor blocks of the thin film transistor and sensing electrode layer.

8. The in-cell touch display structure as claimed in claim 7, further comprising:
   a control circuit connected to the plurality of sensing conductor blocks, so that, in sensing, the control circuit provides a touch driving signals for detecting whether there is an external object approached through the plurality of connection traces and the plurality of sensing conductor blocks.

9. The in-cell touch display structure as claimed in claim 1, wherein the display material layer is a liquid crystal layer.

10. The in-cell touch display structure as claimed in claim 9, further comprising:
   a black matrix layer arranged on one side of the upper substrate facing the display material layer, the black matrix layer being composed of a plurality of opaque lines;
   a color filter layer arranged on one side of the black matrix layer facing the display material layer;
   a common electrode layer disposed between the upper substrate and the lower substrate;
   an upper polarizer layer arranged on one side the upper substrate opposite to the other side of the upper substrate facing the display material layer; and
   a lower polarizer layer arranged on one side of the lower substrate opposite to the other side of the lower substrate facing the display material layer, wherein the plurality of opaque lines of the black matrix layer are disposed at positions corresponding to those of the plurality of gate lines and the plurality of source lines.

11. The in-cell touch display structure as claimed in claim 1, wherein the display material layer is an OLED layer.

12. The in-cell touch display structure as claimed in claim 11, further comprising:
- a cathode layer arranged on one side the upper substrate facing the display material layer, the cathode layer being formed of conductive metal material; and
- an anode layer arranged on one side the thin film transistor and sensing electrode layer facing the display material layer.

13. The in-cell touch display structure as claimed in claim 12, wherein the material display layer is a white emitting layer.

14. The in-cell touch display structure as claimed in claim 12, wherein the display material includes a red emitting layer, a blue emitting layer, and a green emitting layer.

15. The in-cell touch display structure as claimed in claim 12, further comprising:
- a black matrix layer arranged on one side of the upper substrate facing the display material layer, the black matrix layer being composed of a plurality of opaque lines; and
- a color filter layer disposed on one side of the black matrix layer facing the display material layer,
wherein the plurality of opaque lines of the black matrix layer are disposed at positions corresponding to those of the plurality of gate lines and the plurality of source lines.

16. The in-cell touch display structure as claimed in claim 8, wherein the first direction is vertical to the second direction.

* * * * *